(12) United States Patent
Borah et al.

(10) Patent No.: US 7,720,012 B1
(45) Date of Patent: May 18, 2010

(54) SPEAKER IDENTIFICATION IN THE PRESENCE OF PACKET LOSSES

(75) Inventors: Deva K. Borah, Las Cruces, NM (US); Phillip De Leon, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 1344 days.

(21) Appl. No.: 11/178,959

(22) Filed: Jul. 11, 2005

Related U.S. Application Data

(60) Provisional application No. 60/586,889, filed on Jul. 9, 2004.

(51) Int. Cl.
  *H04L 12/16* (2006.01)
(52) U.S. Cl. .................. 370/260; 370/230; 382/159; 704/232; 704/246; 704/256.1; 709/204
(58) Field of Classification Search ............... 370/352, 370/260, 270, 230; 379/100.06; 455/556.2; 704/246, 232, 256.1; 709/204; 382/159
See application file for complete search history.

(56) References Cited

U.S. PATENT DOCUMENTS

| | | | |
|---|---|---|---|
| 4,363,102 A | | 12/1982 | Holmgren et al. |
| 6,041,299 A * | | 3/2000 | Schuster et al. ............. 704/232 |
| 6,195,639 B1 | | 2/2001 | Feltstrom et al. |
| 6,389,392 B1 | | 5/2002 | Pawlewski et al. |
| 6,584,494 B1 * | | 6/2003 | Manabe et al. ............. 709/204 |
| 6,751,590 B1 * | | 6/2004 | Chaudhari et al. .......... 704/246 |
| 6,772,119 B2 * | | 8/2004 | Chaudhari et al. .......... 704/246 |
| 7,457,242 B2 * | | 11/2008 | Beightol et al. ............. 370/230 |
| 7,472,063 B2 * | | 12/2008 | Nefian et al. .............. 704/256.1 |
| 7,617,101 B2 * | | 11/2009 | Chang et al. ................ 704/232 |
| 2002/0103639 A1 | | 8/2002 | Chang et al. |
| 2002/0164070 A1 * | | 11/2002 | Kuhner et al. .............. 382/159 |
| 2003/0036905 A1 | | 2/2003 | Toguri et al. |
| 2003/0088414 A1 * | | 5/2003 | Huang et al. ................ 704/246 |
| 2003/0120489 A1 | | 6/2003 | Krasnansky et al. |
| 2003/0198195 A1 * | | 10/2003 | Li .............................. 370/260 |
| 2005/0276235 A1 * | | 12/2005 | Lee et al. .................... 370/270 |

OTHER PUBLICATIONS

Mayorga, P., Besacier, L., Lamy, R., Serignat, J.-F., Audio packet loss over IP and speech recognition, Nov. 30, 2003, IEEE, 607-612.*

Besacier, L., et al., "GSM Speech Coding and Speaker Recognition", *Proc. IEEE ICASSP'00*, (Jun. 2000), 1-4.

Campbell, Joseph P., et al., "Testing with the YOHO CD-Rom Voice Verification Corpus", *Proc. Int. Conf. Acoustics, Speech, and Signal Processing (ICASSP)*, (1995), 341-344.

Davis, Steven B., et al., "Comparison of Parametric Representations for Monosyllabic Word Recognition in Continuously Spoken Sentences", *IEEE Transactions on Acoustics, Speech, and Signal Processing*, vol. ASSP-28, No. 4, (Aug. 1980), 357-366.

(Continued)

*Primary Examiner*—Gerald Gauthier
(74) *Attorney, Agent, or Firm*—Justin R. Jackson; Philip D. Askenazy; Peacock Myers, P.C.

(57) ABSTRACT

A system, method, and apparatus for identifying a speaker of an utterance, particularly when the utterance has portions of it missing due to packet losses. Different packet loss models are applied to each speaker's training data in order to improve accuracy, especially for small packet sizes.

20 Claims, 6 Drawing Sheets

OTHER PUBLICATIONS

Goldsmith, J., et al., "Capacity, Mutual Information, and Coding for Finite-State Markov Channels", *IEEE Trans. Signal Processing*, vol. 42, (May 1996),868-886.

Quatieri, Thomas F., "Discrete-Time Speech Signal Processing Principles and Practice", *Prentice-Hall, Inc., New Jersey, 2002*, textbook discription on 3 pages provided,(2002).

Reynolds, Douglas A., et al., "Robust Text-Independent Speaker Identification Using Gaussian Mixture Speaker Models", *IEEE Transactions on Speech and Audio Processing*, vol. 3, No. 1, (Jan. 1995),72-83.

* cited by examiner

SPEAKER IDENTIFICATION IN THE PRESENCE OF PACKET LOSSES

CROSS-REFERENCE TO RELATED APPLICATIONS

This application claims priority to and the benefit of the filing of U.S. Provisional Patent Application Ser. No. 60/586,889, entitled "Speaker Identification in the Presence of Packet Losses", filed on Jul. 9, 2004, and the specification thereof is incorporated herein by reference.

BACKGROUND OF THE INVENTION

1. Field of the Invention (Technical Field)

The present invention relates to an algorithm for improving speaker identification in lossy channels. Particularly, the present invention is preferably directed to an algorithm that trains a Gaussian Mixture Model (GMM) with several packet loss rate models for each known speaker, and the best speaker match is identified over all the loss model sets.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

An objective of speaker identification algorithms is to determine which voice sample from a set of known voice samples best matches the characteristics of an unknown input voice sample. This involves extraction of speaker dependent features from the known voice samples, model building for each known sample, and eventual matching of the features extracted from the unknown voice sample.

Speaker identification systems typically work as follows: prior to speaker identification, the system must first be trained, i.e. create a table associating each individual speaker with a distinguishing set of parameters based on the individual's speech signal; afterward, a new speech signal from an unknown user is acquired and a parameter set is determined; finally, a comparison is made with the unknown individual's parameter set and the entries in the table in order to determine a closest "match" and subsequent identification of the speaker.

Of various speaker identification techniques, the Gaussian mixture model (GMM)-based speaker identification algorithm has shown to be remarkably successful in identifying speakers from a large population. The GMM approach provides a probabilistic model where an implicit segmentation of the speech into phonetic sound classes prior to speaker model training takes place. It is further known that the performance of the GMM-based method is near 100% up to a population size of 630 speakers using the TIMIT speech database (clean speech) with about 24 seconds of training and 6 seconds of test utterances, (see D. Reynolds and R. Rose, "Robust Text-Independent Speaker Identification Using Gaussian Mixture Speaker Models," *IEEE Trans. Signal Processing*, vol. 3, no. 1, pp. 72-83, January 1995). However, the performance degrades significantly for telephone-quality speech and is near only 60% for a similar size population.

Recently, there has been an interest in studying the performance of speaker identification algorithms in the context of mobile wireless channels. It is well known that in order to achieve high transmission efficiency, speech signals in such systems undergo speech coders and decoders which modify the original voice signal. In addition, the uncertain connection strength of wireless channels can cause data packet loss during deep fading periods. Each data packet contains a fixed number of speech samples and the loss of a packet results in the loss of the speech samples contained in the packet. For small packet sizes, these losses can result in degraded accuracy of the speaker identification system.

The effect of GSM (Global System for Mobile Communication) coders on speaker recognition has previously been investigated, (see L. Besacier, S. Grassi, A. Dufaux, M. Ansorge, and F. Pellandini, "GSM speech coding and speaker recognition," in *Proc. IEEE ICASSP'00*, June 2000.). It has been shown that the usage of GSM coding significantly degrades performance. By extracting features directly from the encoded bit stream, Besacier et al. were able to improve the performance of the system. However, the effects of packet loss due to the mobile wireless channel has a significant impact on such systems.

U.S. Pat. No. 6,389,392, to Pawlewski et al. discloses a speaker recognition system which makes use of an algorithm which itself relies on Mel Frequency Cestrum Coefficients, overlapping Hamming Windows, Fast Fourier Transforms, and logarithmically spaced triangular band pass filters. The prior art, including that disclosed by Pawlewski et al., fails to teach a system which can be trained with several packet loss models. Further, Pawlewski et al. rely on pattern recognition rather than on statistical analysis for identification. There is thus a need for an invention which improves speaker identification in the presence of packet losses, particularly those losses associated with wireless channels and Voice over IP (VoIP) internet environments.

BRIEF SUMMARY OF THE INVENTION

The present invention is a method for speaker identification, the method comprising the steps of extracting one or more features from training data comprising utterances from known speakers, the training data comprising packet losses; obtaining at least one parameter set corresponding to the features of the training data of each known speaker; extracting one or more features from test data comprising utterances from an unknown speaker; determining a probability for each parameter set that the features from the test data arise from that parameter set; and identifying the unknown speaker by determining which known speaker's parameter set maximizes the probability. The obtaining step is preferably performed using a Gaussian mixing model (GMM).

The test data preferably comprises packet losses. The method optionally further comprises the steps of estimating or determining the packet loss rate for the test data; and applying the test data packet loss rate to the training data. The obtaining step preferably comprises generating a parameter set for each of at least two packet loss rates. The at least two packet loss rates preferably range between approximately 0% and approximately 50%. Six packet loss rates are preferably used to generate a distinguishing parameter set. The length of identification data used is preferably sufficiently large enough, preferably at least approximately six seconds, so that identification accuracy of test data comprising between about 8 and about 16 samples per packet is approximately the same as identification accuracy of test data comprising greater than 16 samples per packets. The length of identification data used is preferably sufficiently large enough, preferably at least approximately eight seconds, so that identification accuracy of test data comprising a packet loss rate of 50% is approximately the same as identification accuracy of test data comprising a packet loss rate of 0%.

The obtaining step is preferably performed via computer software stored in a computer-readable storage medium, or is optionally implemented in computer hardware, preferably a digital signal processor or field programmable gate array (FPGA). Each parameter set is preferably stored in a computer-readable storage medium.

The invention is also a computer software product comprising a computer-readable storage medium in which program instructions are stored, which instructions, when read by a computer receiving training data comprising utterances from known speakers, the training data comprising packet losses, and test data comprising utterances from an unknown speaker, cause the computer to extract one or more features from training data comprising utterances from known speakers, the training data comprising packet losses; obtain at least one parameter set corresponding to the features of the training data of each known speaker; extract one or more features from test data comprising utterances from an unknown speaker; determine a probability for each parameter set that the features from the test data arise from that parameter set; and identify the unknown speaker by determining which known speaker's parameter set maximizes the probability. The test data preferably comprises packet losses. The computer optionally estimates a packet loss rate of the test data and applies the test data packet loss rate to the training data. The computer preferably generates a plurality of parameter sets corresponding to each known speaker, each such parameter set comprising a different packet loss rate. The parameter sets are preferably stored on a computer-readable storage medium.

A primary object of the present invention is to provide a user with the ability to identify the speaker of an utterance, even when such utterance is transmitted over typical wireless or VoIP systems.

Another object of the present invention is to provide a speaker identification system which is accurate for small packet sizes.

A primary advantage of the present invention is that a system is provided wherein the speaker of an utterance can be identified even when the utterance is of poor quality due to missing data packets of the utterance.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Although Gaussian mixture model (GMM)-based speaker identification systems have proved remarkably accurate for large populations using reasonable lengths of high-quality test utterances, utterances acquired from cellular telephones or over the Internet (VoIP) typically suffer from dropouts caused by packet loss. These losses result in degraded accuracy of known speaker identification systems. Each data packet typically contains a fixed number of speech samples and the loss of a packet results in the loss of the speech samples contained in the packet. For small packet sizes, these losses can result in degraded accuracy of the speaker identification system. By training the GMM model with lossy packets, corresponding to the loss rate experienced by the speaker to be identified, significant performance improvement is obtained. In order to avoid the estimation of the packet loss rate, an algorithm is preferably used to identify the user based on maximizing the a posteriori probability over the GMM models of the users trained with several packet loss rates. The algorithm of the present invention greatly improves identification performance, especially for small packet sizes, under these conditions.

The present invention may be implemented in software executable on a computer or processor, or may alternatively be implemented in hardware, including but not limited to a board comprising one or more digital signal processors, field programmable gate arrays (FPGA's), or the like. Speaker data may be stored using any electronic storage media known in the art, including but not limited to random access memory (RAM) chips, read only memory (ROM), magnetic storage media, optical storage media, and the like, and combinations thereof.

Figure 1:
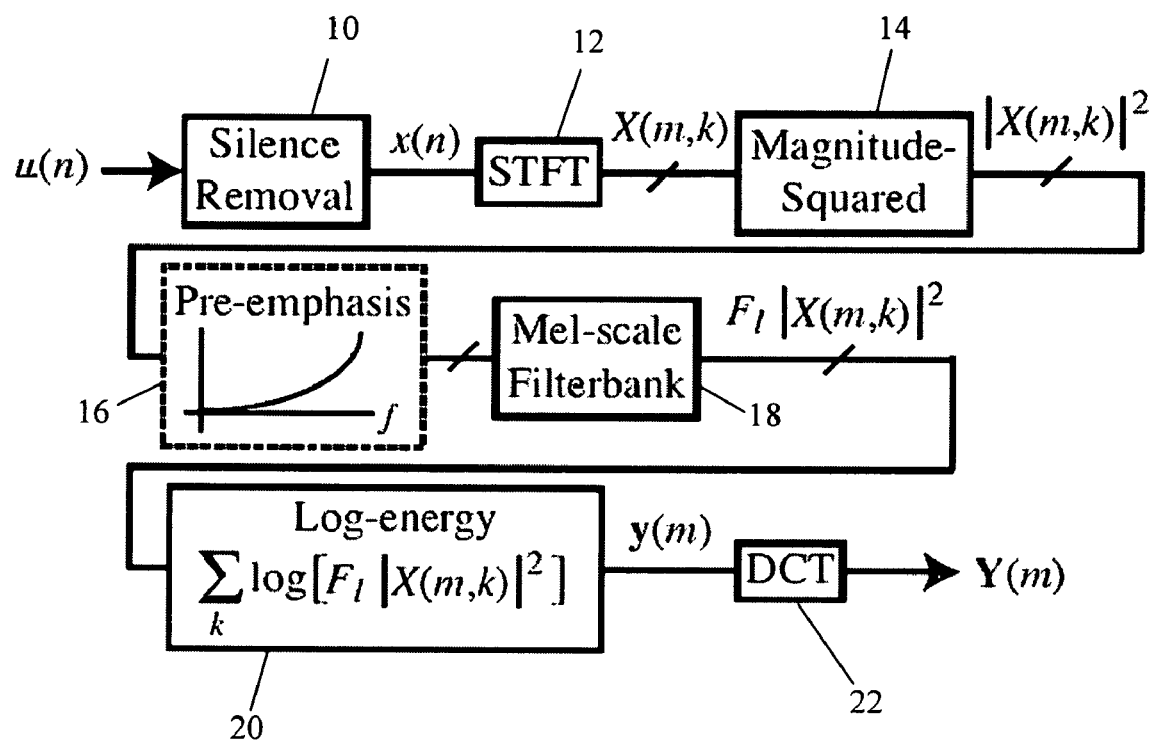
FIG. 1 is a block diagram of the Mel-scale cepstral feature analysis of the present invention.
Figure 2:
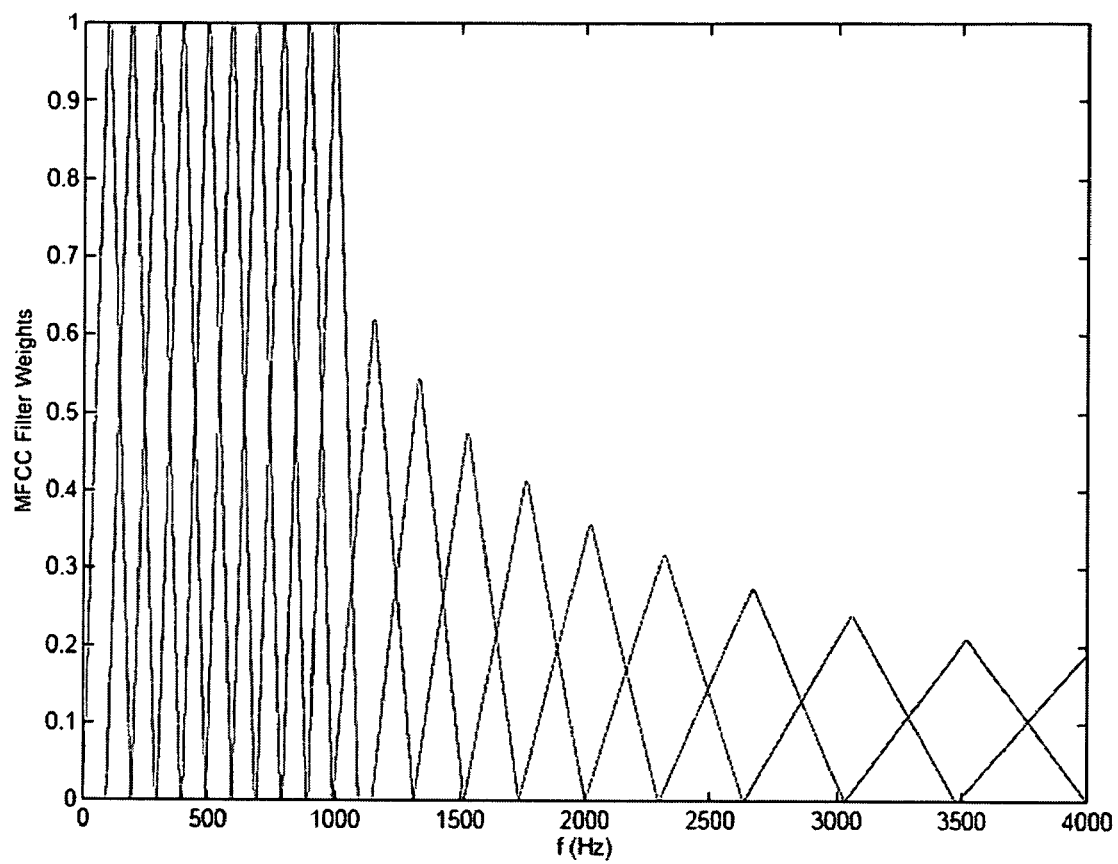
FIG. 2 is a graph showing a preferred 20-channel Mel-scale filterbank used in the present invention.

The first step of the present invention, in either the training or identification stage, is to perform an analysis of the speech signal and extract feature vectors for each speaker. FIG. 1 depicts a block diagram for a Mel-scale cepstral feature analysis and illustrates the steps involved in the feature extraction stage. First, speech utterance u(n) is obtained. Then, as depicted in block 10, silence is preferably removed from utterance u(n) (samples assumed to be normalized). While silence times of various lengths can be removed from the speech, it is preferable that energy contained in non-overlapping windows of about 3 ms be compared to a predetermined magnitude. If the energy is below the predetermined magnitude, which is preferably a value of approximately 0.012, the window of speech is assumed to be silence, and is preferably removed from the utterance. Next, a short-time Fourier transform (STFT) 12 is preferably applied to the utterance with silence removed, x(n), resulting in X(m,k). The STFTs (preferably 1024-point) are preferably computed using about 20 ms Hamming-windowed segments with preferably about 50% overlap. Magnitude-squared data $|X(m,k)|^2$ is then computed 14, and pre-emphasis 16 is preferably applied in order to boost the higher frequencies. Next a mel-scale filterbank 18, preferably comprising 20-channels, is preferably applied in order to weight the spectrogram. A graph depicting a bank of preferable frequencies is shown in FIG. 2. The filterbank is preferably designed with triangular responses and the first ten center frequencies are preferably uniformly spaced over 1 kHz while the second ten center frequencies are preferably logarithmically spaced over the remaining 3 kHz. The filters $F_l$ are preferably normalized according to their bandwidth. The log-energy y(m,l) of each channel is calculated 20 and the Discrete Cosine Transform (DCT) 22 of the vector is computed. The resulting feature vector is the 20×1 mel-cepstrum Y(m), which is preferably computed every 10 ms. While speech lasting for various lengths of time can be used and will produce desirable results, it is preferable that the training speech last for about 90 s, and the identification speech preferably lasts for 15 s or more.

Once the feature vectors have been extracted from speech training data, the first step in the development of the speaker identification algorithm is to extract the set λ of model parameters for each known speaker. The probability density function of the feature vector Y of a given speaker is preferably modeled as a Gaussian mixture given by Equation 1.

$$p(Y|\lambda_s) = \sum_{i=1}^{W} \left\{ \frac{w_i}{\sqrt{(2\pi)^L \sigma_{i,1}\sigma_{i,2} \ldots \sigma_{i,L}}} \times \exp\left(-\frac{1}{2}\sum_{k=1}^{L} \frac{|Y_k - m_{i,k}|^2}{\sigma_{i,k}^2}\right)\right\} \quad \text{Equation 1}$$

In Equation 1, W is the number of mixture components, L is the feature vector length, $w_i$ is the weight of the i-th mixture component, and $m_{i,k}$ and $\sigma_{i,k}$ denote the mean and the variance respectively of the k-th component of the feature vector corresponding to the i-th mixture component. The weights, means and the variances are collectively represented by the parameter set $\lambda_s$ for the s-th speaker. Thus, each speaker s is represented by a Gaussian mixture model (GMM) and is referred to by his/her model $\lambda_s$.

The value of the parameter set λ for each known speaker is determined by which parameter set provides the maximum probability density of feature vector Y. A maximum likelihood (ML) parameter set estimation approach results in a difficult nonlinear optimization problem. Therefore, iterative techniques, such as the expectation maximization (EM) algorithm, are preferably employed which guarantee convergence to local minima. The EM algorithm preferably begins with an initial estimate of the parameter set, and then iteratively improves upon the previous estimates with new updated estimates. The iterations preferably continue until some convergence threshold is reached.

Once the GMM parameter sets of all the known speakers in the training set are obtained, identification of an unknown speaker can begin. In this step of identification, it is typically assumed that all S known speakers in the training set are equally likely. In that case, it is well-known that the maximum a posteriori (MAP) detection becomes the ML detection for the user estimate $\hat{S}$ given by Equation 2 under the assumption that the observations are independent. Each parameter set $\lambda_s$ for the s-th known speaker is input into Equation 2; the parameter which results in the maximum probability corresponds with the known speaker which is the closest match to the unknown speaker. In Equation 2, T represents the number of feature vectors $Y_i$ of the unknown speaker.

$$\hat{S} = \arg \max_{1 \le s \le S} \prod_{i=1}^{T} p(Y_i | \lambda_s) \quad \text{Equation 2}$$

Existing GMM speaker identification systems assume that during training the speech utterances are complete, i.e. no interruptions due to packet loss. Therefore, only the test data are incomplete due to packet loss. In order to simplify, the packet loss model (described below) is applied to fixed-sized packets each assumed to have a fixed number of speech samples. However, packets usually contain coded speech so when a packet is lost, depending on the coding scheme and compression ratio, numerous speech samples are typically lost.

While numerous packet loss models can be used and will produce desirable results, a simulation was performed using the well-known Gilbert-Elliot channel. This channel has two states: good and bad. When the state is 'good', the transmitted packet is received without any error; during a 'bad' state the packet is considered lost. This type of packet loss model has been widely used both in the wireless communications literature and in the Internet traffic modeling area. For simulation purposes, the samples of a Rayleigh fading channel are preferably simulated using the Jakes model with the Doppler spectrum given by Equation 3 for $|f| \le f_D$, where $f_D$, is called the Doppler frequency. The power of the samples over the packet duration is calculated and the channel is considered 'good' if the power is above a certain threshold.

$$S(f) = \frac{1}{\pi f_D \sqrt{1 - f^2/f_D^2}} \quad \text{Equation 3}$$

Figure 3:
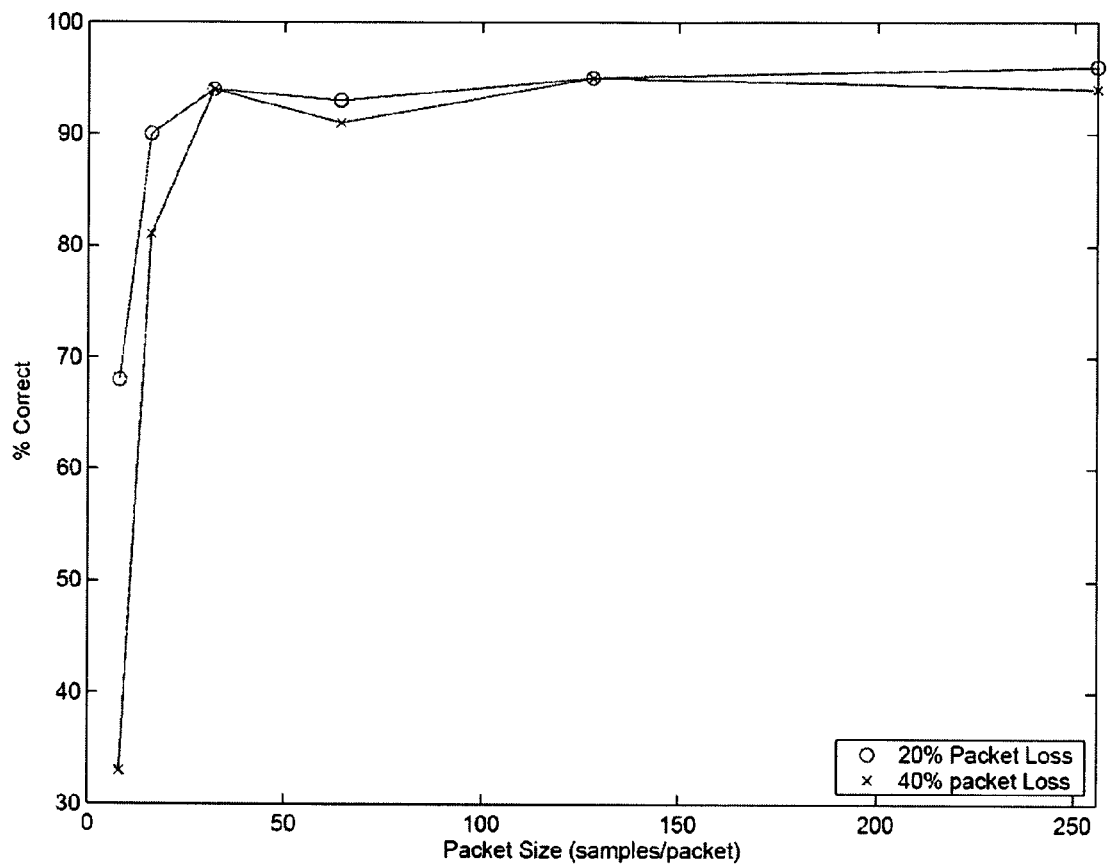
FIG. 3 is a graph showing speaker identification performance of typical speaker ID systems with packet loss rates of 20% and 40%.

Using the above GMM-based speaker identification system together with test data (that is, the data from the unknown speaker) subjected to packet loss, speaker identification for various packet sizes and different packet loss rates was simulated. The number of Gaussian mixture components was W=10, and the feature vector length was L=19. FIG. 3 illustrates the consistently good speaker identification rates (about 95%) for packet sizes above 32 samples per packet that were obtained, even with packet loss rates of 40%. However, with smaller packets (8 and 16 samples per packet), the performance noticeably degraded. In the case of 8 samples/packet, the performance was 68% correct identification with 20% packet loss and only 33% correct identification with 40% packet loss. The small size packet losses directly affect the components of the feature vectors changing their statistics.

Figure 4:
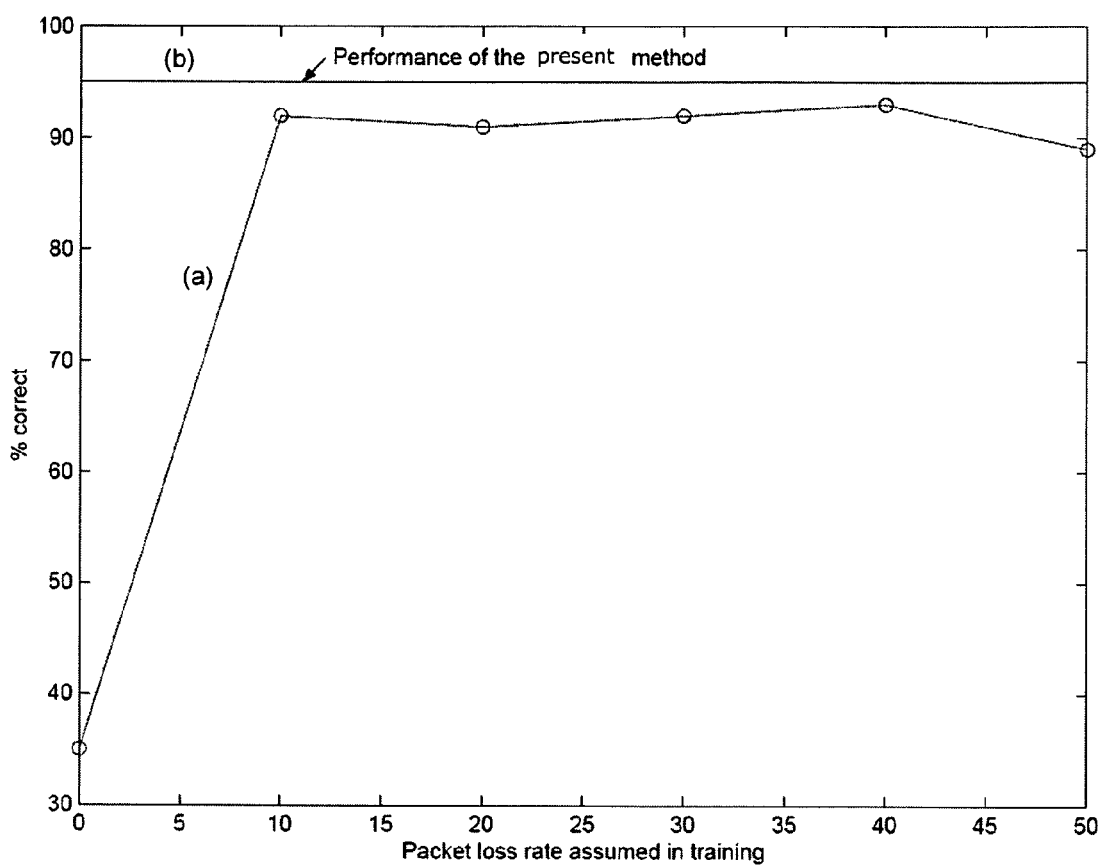
FIG. 4 is a graph showing (a) GMM-based speaker identification performance when lossy packets having different assumed loss rates are used for training the system and the unknown speaker has a packet loss rate of 30%, and (b) performance of the present invention when a set of multiple loss rates is used for training data.

Unlike existing methods, the present invention utilizes lossy packet training approaches for improving the speaker identification performance in lossy channels. When the packet loss rate of the unknown speaker (the test data) is known or can be accurately estimated, the same losses can be applied to training data for all S users prior to identification thereby providing a better match between training and test data. As shown by curve (a) in FIG. 4, with lossy test data (30% packet loss) but lossless training data (0% assumed packet loss rate), the recognition rate was 35%. However, by using lossy training data (including but not limited to 30% packet loss), the recognition rate improved to above 90%. However, when large mismatches occurred between the actual packet loss rate for test data and that applied to the training data, performance was degraded. In FIG. 4, the identification rate has decreased to 89% when a 50% loss rate is used in the training data but a 30% loss rate actually occurs in the test data. As shown in FIG. 4, the performance is relatively insensitive to small errors in the loss rate estimation.

In another lossy training approach, in order to avoid the necessity of estimating the loss rate, a set of GMM parameters for each speaker's training data with different applied packet loss rates was generated. Since results are relatively insensitive to small errors in loss rate estimation, M=6 is preferably chosen with loss rates of 0%, 10%, 20%, 30%, 40%, and 50%. The algorithm then obtains the MAP estimate over the set of loss models given by equation 4, $$\hat{S} = \arg \max_{1 \le k \le S, 1 \le l \le M} \prod_{i=1}^{T} p(Y_i \mid \lambda_{s,l})$$

where $\lambda_{s,l}$ denotes the GMM parameter set for speaker s under the loss rate model l, $1 \le l \le M$. Curve (b) in FIG. 4 shows that the identification performance of the present invention has improved to 95% without requiring any explicit loss rate estimation of the channel. In this method, a set of GMM models for several packet loss rate models for each known speaker is used, and the best speaker match is identified over all the loss model sets.

Figure 5:
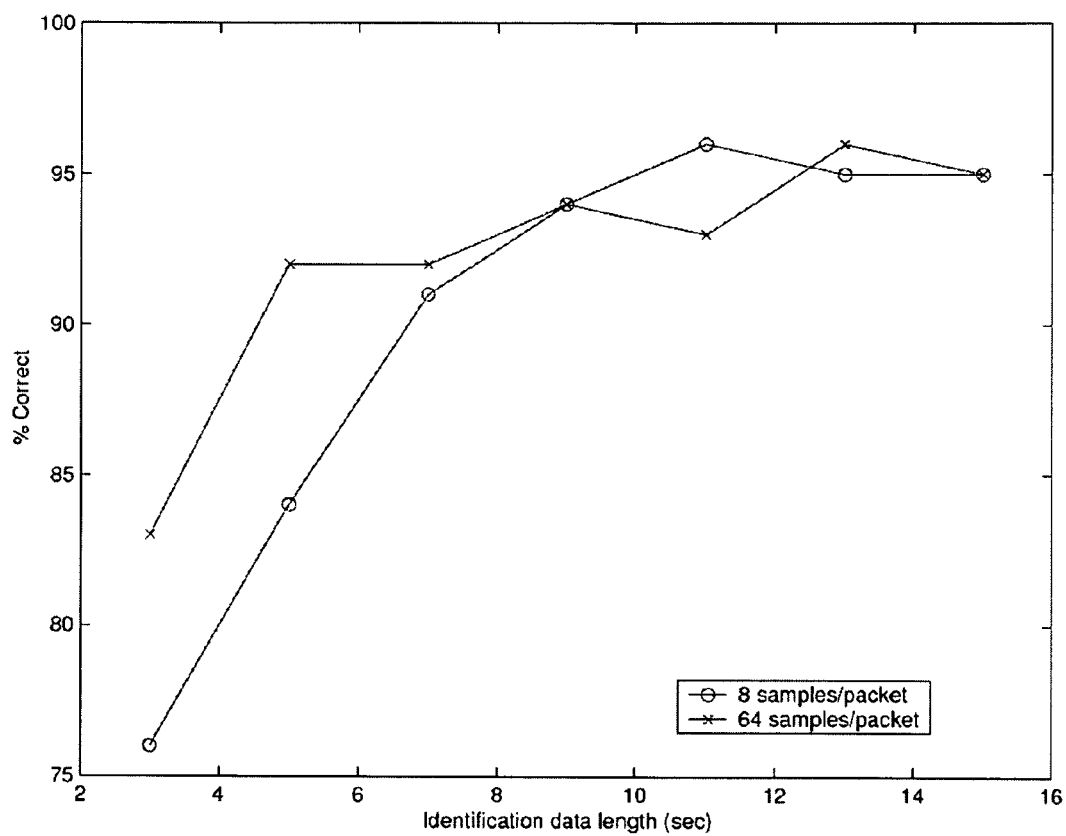
FIG. 5 is a graph showing speaker identification results as a function of identification data length for the present invention for 8 and 64 samples per packet with a packet loss rate of 40%.
Figure 6:
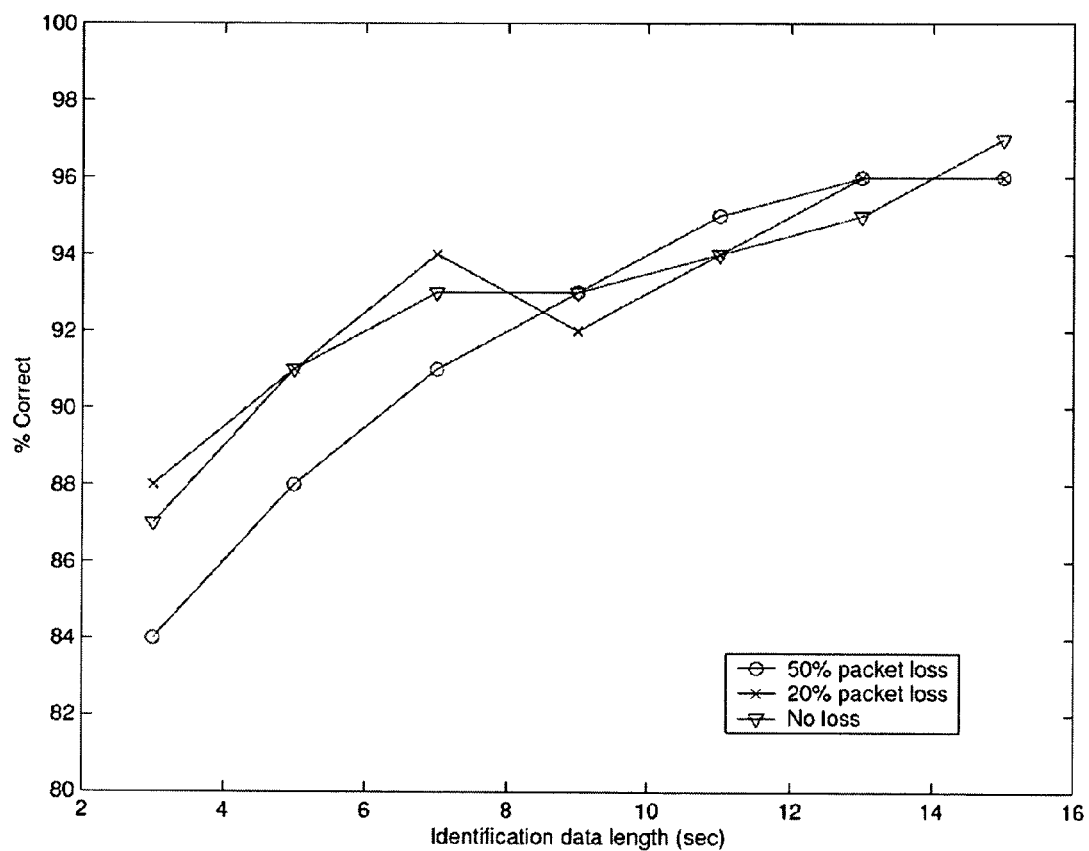
FIG. 6 is a graph showing speaker identification performance as a function of identification data length for different packet loss rates, where each packet contains 16 samples.

FIGS. 5 and 6 show that the identification performance of the present invention increases with the length of the identification data. Packets containing more samples show better performance with small identification data. However, as more data are used, the performance behavior for small packet sizes becomes nearly similar to that of large packet sizes. FIG. 6 shows that in more lossy channels, identification performance is poorer for smaller identification data. The figure also shows results for packets with no losses. The present invention uses a hard measure of speaker identification unlike the soft measures typically used in the prior art. Therefore, ignoring minor variations, for the present invention the 20% loss rate case behaves similar to the no loss case. For larger identification data, behavior for different loss rates becomes similar to the no loss case. Thus, for small packet sizes (approximately 8-16 speech samples/packet), the present invention provides much better identification accuracy than prior methods.

The preceding examples can be repeated with similar success by substituting the generically or specifically described operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above and/or in the attachments, and of the corresponding application(s), are hereby incorporated by reference.

What is claimed is:

1. A method for causing a computer to perform speaker identification, the computer executing code stored on a computer readable medium, the code comprising instructions for:
   the computer extracting one or more features from training data comprising utterances from known speakers transmitted over a lossy channel, the training data comprising packet losses;
   the computer obtaining at least one parameter set corresponding to the features of the training data of each known speaker;
   the computer extracting one or more features from test data comprising utterances from an unknown speaker;
   the computer determining a probability for each parameter set that the features from the test data arise from that parameter set; and
   the computer identifying the unknown speaker by determining which known speaker's parameter set maximizes the probability.

2. The method of claim 1 wherein obtaining at least one parameter is performed by the computer using a Gaussian mixing model (GMM).

3. The method of claim 1 wherein the test data comprises packet losses.

4. The method of claim 3 further comprising:
   the computer estimating or determining a packet loss rate for the test data; and
   the computer applying the test data packet loss rate to the training data.

5. The method of claim 1 wherein obtaining at least one parameter comprises the computer generating a parameter set for each of at least two packet loss rates.

6. The method of claim 5 wherein the at least two packet loss rates range between approximately 0% and approximately 50%.

7. The method of claim 5 wherein six packet loss rates are used by the computer to generate a distinguishing parameter set.

8. The method of claim 3 wherein a length of identification data used is sufficiently large enough so that identification accuracy of test data comprising between about 8 and about 16 samples per packet is approximately the same as identification accuracy of test data comprising greater than 16 samples per packets.

9. The method of claim 8 wherein the length of identification data used is at least approximately six seconds.

10. The method of claim 3 wherein a length of identification data used by the computer is sufficiently large enough so that identification accuracy of test data comprising a packet loss rate of 50% is approximately the same as identification accuracy of test data comprising a packet loss rate of 0%.

11. The method of claim 10 wherein the length of identification data used by the computer is at least approximately eight seconds.

12. The method of claim 1 wherein obtaining at least one parameter is performed by the computer via the instructions.

13. The method of claim 1 wherein obtaining at least one parameter is implemented in hardware of the computer.

14. The method of claim 13 wherein the hardware is selected from the group consisting of digital signal processor and field programmable gate array (FPGA).

15. The method of claim 1 wherein each parameter set is stored in the code.

16. Computer readable material encoded with software that identifies an unknown speaker, said software comprising:
   program instructions which when read by a computer that is receiving training data comprising utterances from known speakers, the training data comprising packet losses, and the test data comprising utterances from an unknown speaker, cause the computer to extract one or more features from training data comprising utterances from known speakers, the training data comprising packet losses;

obtain at least one parameter set corresponding to the features of the training data of each known speaker; extract one or more features from test data comprising utterances from an unknown speaker; determine a probability for each parameter set that the features from the test data arise from that parameter set; and identify the unknown speaker by determining which known speaker's parameter set maximizes the probability.

17. The computer readable material of claim 16 wherein the test data comprises packet losses.

18. The computer readable material of claim 17 wherein the computer estimates a packet loss rate of the test data and applies the test data packet loss rate to the training data.

19. The computer readable material of claim 16 wherein the computer generates a plurality of parameter sets corresponding to each known speaker, each such parameter set comprising a different packet loss rate.

20. The computer readable material of claim 16 wherein the parameter sets are stored on a computer-readable storage medium.

* * * * *